Dec. 2, 1969

Y. A. GAILLARD 3,481,241

METHOD AND APPARATUS FOR STORING AND
RETRIEVING TECHNICAL MUSICAL DATA

Filed Sept. 22, 1966

INVENTOR

YVON ANDRE GAILLARD

BY
Robertson, Bryan, Parmelee & Johnson

ATTORNEY

M = Major
m = minor

United States Patent Office 3,481,241
Patented Dec. 2, 1969

3,481,241
METHOD AND APPARATUS FOR STORING AND RETRIEVING TECHNICAL MUSICAL DATA
Yvon Andre Gaillard, Caixa Postal 21.037, Broklin Paulista, Sao Paulo, Brazil
Filed Sept. 22, 1966, Ser. No. 581,347
Int. Cl. G09b *15/02, 15/00;* G06c *3/00*
U.S. Cl. 84—474                    5 Claims

ABSTRACT OF THE DISCLOSURE

An apparatus is described for storing and retrieval of technical musical data. A bottom plate is provided with a tabulation of chromatic tonalities arranged in columnar segments, each of which is designated by a basic tonality. The columnar segments are arranged with adjacent basic tonality sequences in accordance with a musical law of intervals. Each of the columnar segments are further composed of tabulations of sharps and flats designations of consecutively increasing tonal values in preselected relationship with the adjacent basic tonalities. A top template is adjustably mounted with respect to the bottom plate and provided with read-out apertures and index apertures whereby any desired musical grouping may be obtained for any one and all of the basic tonalities by selectively superimposing the top template over the bottom plate tabulation whereupon musical groupings are revealed through read-out apertures for the basic tonality in registration with the index aperture.

---

This invention relates to a method and apparatus for making available to music students, teachers, composers, orchestrators, musicians and others concerned with music, a broad spectrum of answers to technical questions in musical technique.

Summary

According to my invention, a complete range of major and minor tonalities is tabulated in a columnar arrangement to establish the "memory" of the stored data. Other data responsive to a variety of questions such as those concerning tones, scales, chords, harmonics, modulations, etc., are tabulated in a similar columnar arrangement to establish the "reader" of selected data from the memory tabulation. The reader data for selected questions or groups of questions are so positioned in the columnar tabulation that when the reader is superimposed on the memory, the reader will designate groups of tonalities of the memory for retrieval of desired technical musical data according to selected positions of adjustment of the superimposed tabulations.

The memory tabulation is arranged in nineteen segments, each segment comprising two columns of seven values each so that each segment contains a total of fourteen tonal values of which seven correspond to the ascending and seven to the descending values of the basic tonality to which they refer. The tabulation is further characterized by the fact that it includes designations of a denominative total of fifteen major tonalities and fifteen minor tonalities of the musical scale, tonally equivalent to twelve major tonalities and twelve minor tonalities, in the nineteen segments as described and arranged in accordance with the laws of fifths and fourths.

A critical aspect of my tabulating method lies in the introduction at the end of the sequence of fifths, i.e., after the eleventh segment, of a twelfth segment not ordinarily regarded by musicians as having any practical significance but which I have discovered to be essential to the operation of the method and means to be described. This twelfth segment might be characterized as a "grey zone" which by its presence creates continuity of the tabulation for solution of the broad spectrum of problems that is made possible by my invention. The "why" of this important aspect of my invention will appear from the description which follows.

The form of the apparatus which may be used in the practice of my method is subject to numerous variations, for the memory tabulation can be made in a straight line table or in columns which are comprised in the segments of a disc (my presently preferred form) or on the surface of a sphere. The essential characteristics of the invention therefore are generic to all such forms of apparatus.

Description

With reference to the accompanying drawings I shall now describe the best mode contemplated by me for carrying out my invention.

FIG. 1 is a tabulation of tonalities arranged in accordance with my invention to form the memory component as used in my method and apparatus.

Figure 2:
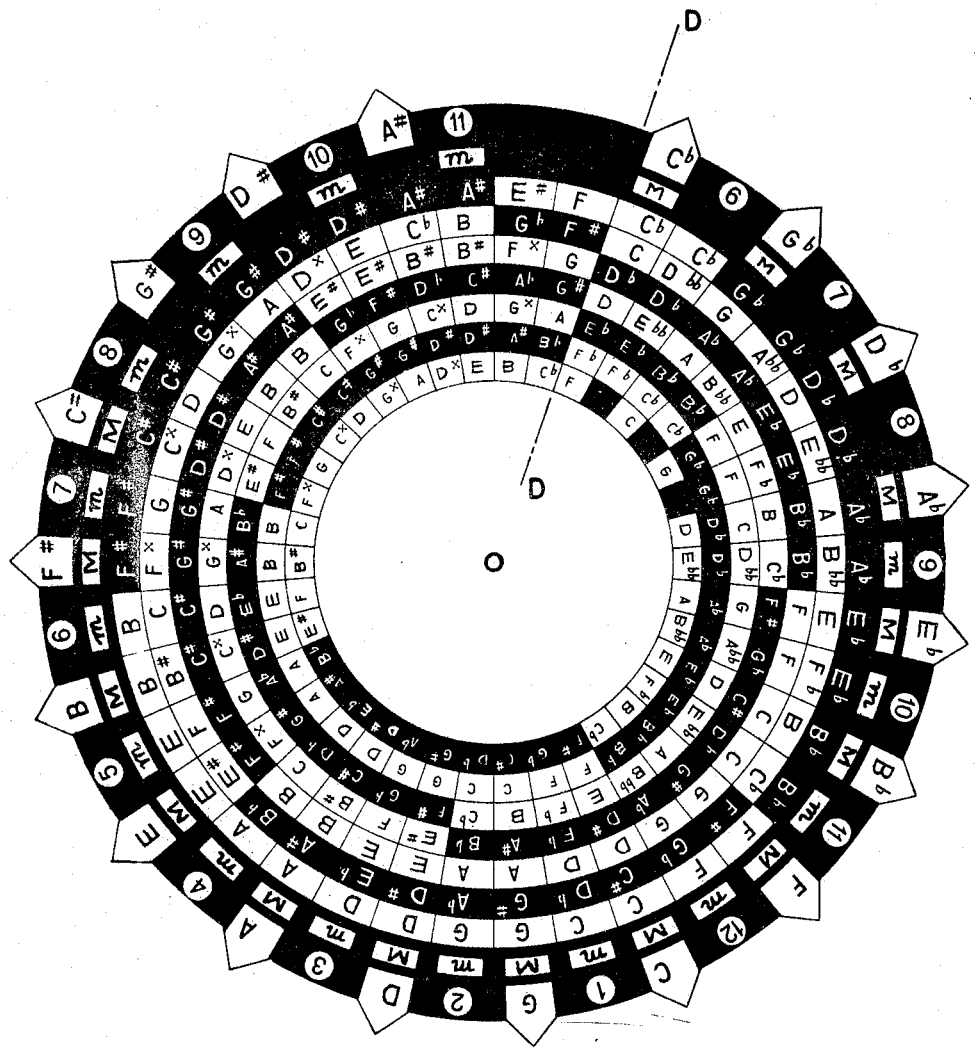
FIG. 2 shows a discoidal arrangement of the memory data of FIG. 1.

My musical computing method is based upon a tabulation of the 12 basic musical tonalities, both major and minor, that constitute the chromatic scale, making a total of 24 tonal sets of 7 values each. This tabulation of tonalities makes available information relative to an extensive number of technical musical questions such as the tones and semi-tones, the scales in all their forms (chromatic, major and minor tonal, harmonic and melodic, diatonic, etc.), the chords in all their varieties (consonances, dissonances, major chords, minor chords, diminished, augmented, dominant, etc.), the tonal distances (2nd, 3rd, 4th, etc., major, minor, augmented, diminished and prime), the enharmonics, the harmonic laws, the basic chords, the modulations, the harmonic resolutions, the perfect major and minor chords, etc.

The "Memory"

FIG. 1 illustrates the "memory" tabulation comprising the 12 ascending and descending tones that make up the chromatic scale of each basic tonality arranged in vertical columns. The first 7 columns are found in the column of the same basic tonality to which they belong and the remaining 5 are placed in the column of the following basic tonality to which they also belong by virtue of the "kinship" that by the laws of fifths and fourths orderly interassociate the 12 ascending and descending chromatic scales.

Thus it will be observed that the sequence of the 12 basic tonalities (major and minor) conforms to the sequence of the fifths (in the ascending sense-scale of sharps) and therefore to the sequence of the fourths (in the descending sense-scale of flats). According to its turn, the sequence of tonal values of each one of the basic tonalities responds to the normal chromatic succession.

The arrangement of the tonal values in my method represents an extremely important element within the general concept. Notice that there are 19 vertical segments corresponding to the 12 major and minor basic tonalities arranged in accordance with the laws of fifths and fourths, each segment comprising two columns of 7 values each, so that each segment contains a total of 14 tonal values of which 7 correspond to the ascending and 7 to the descending values of the basic tonality to which they refer.

The sequence of the 19 segments ranges from the basic tonality of C (No. 1), in ascending, order, to the basic tonalities of G (No. 2), D (No. 3), A (No. 4), E (No. 5), B (No. 6), F sharp (No. 7), C sharp (No. 8), G sharp (No. 9), D sharp (No. 10) and A sharp (No. 11). A segment without name or number follows and from there we have, enumerated from 6 to 12, the basic tonalities of C flat (No. 6), G flat (No. 7), D flat (No. 8), A flat (No. 9), E flat (No. 10), B flat (No. 11) and F (No. 12).

It will be seen that the 19 segments enumerated above are actually 24 corresponding to the 12 tonalities of the sequence or progression of fifths and to the 12 tonalities of the sequence or progression of fourths, the first one being formed by the sequence numbered from 1 to 11, that is C, G, D, A, E, B, F sharp, C sharp, G sharp, D sharp and A sharp; the 12th segment has no name or number because the group of values that integrate it have no practical meaning in the sense of their denominations, although they tonally exist. This segment theoretically corresponds to the ascending and descending scales of the basic tonality of E sharp, that in practice are equivalent to the ascending and descending scale of the basic tonality of F (No. 12 of the chart). The introduction of this 12th segment of exclusively theoretical meaning is nevertheless essential to the system; it represents the end of the sequence of fifths and at the same time, like a real "grey zone," conditions the continuity of the chart that is accomplished by introducing the other tonalities from 6 to 12, respectively, C flat, G flat, D flat, A flat, E flat, B flat and F. Therefore, the 12th tonality of the scale of fifths is theoretically at the side of the 11th of the scale of the same name and practically, or rather actually, displaced from that sequence, that is, placed at the side of the 11th tonality of the progression of fourths. Displaced, it must be noted, only when thought of as being the end of the progression of fifths; but since it also incorporates as it does the function of being the end of the sequence of fourths, in that sequence it is in its normal hierarchic position both practically and theoretically, that is, after the tonality of No. 11 (B flat). This double aspect of the final segment of the sequence of fifths represents, therefore, a very significant feature, theoretical after A sharp and real at the side of B flat.

We see that the arrangement of the sequence of fifths as described in the tabulation of FIG. 1 is relatively simple; the sequence of fourths, on the other hand, offers a more complex development; it uses the first 5 basic tonalities of the sequence of fifths, that is, C, G, D, A and E; the 7 remaining tonalities (making a total of 12 basic tonalities) are arranged in 7 additional segments, that is, starting from the segment that has not been named or numbered that theoretically comprises the progression of fifths, proceeding with the tonalities of C flat (No. 6), G flat (No. 7), D flat (No. 8), A flat (No. 9), E flat (No. 10), B flat (No. 11) and F (No. 12).

Thus I have provided a method and means of storing and retrieving technical musical data fundamentally characterized by a special arrangement of basic tonalities and respective chromatic scales through the interruptions (in the denominational sense) of the progression of fourths and fifths. The latter presents an interruption at the end of its actual continuity with the adoption of a segment of tonal value, but meaningless from the denominational point of view; insertion of a broad range of tonalities of the sequence of fifths and recovery of the end of the progression at the end of the chart; the other sequence, that of fourths, is practically inserted in the sequence of fifths, its continuity broken by 7 tonalities of the latter and being resumed in the 8th segment and from there to the end. From this structure it results that the arrangement of data in FIG. 1 actually shows the 12 tonalities (major and minor) of the rising progression (of sharps) and of the descending progression (of flats) and it will also be noted that such arrangement includes the basic tonalities that comprise scales of the major and minor species, that is, C, G, D, A, E, B, F sharp, C sharp, A flat, E flat, B flat and F; those that only comprise the major scale, that is C flat, G flat and D flat, and, finally, those that comprise only the minor scale, that is, G sharp, D sharp and A sharp.

The arrangement disclosed in FIG. 1, therefore, does not follow, as has been seen, the theoretical sequences of the basic tonal values. It adopts instead the basic sequences (ascending and descending), inserting therein the tonally identical denominations according to the following:

```
                MAJOR   MINOR
 1
 2
 3
 4
 5
 6                              6   C flat   MAJOR   MINOR
 7   F sharp                    7   G flat
 8   C sharp                    8   D flat
 9   G sharp                    9   A flat
10   D sharp                   10   E flat
11   A sharp                   11   B flat
                               12   F
``` resulting in a denominative total of 15 major tonalities and 15 minor tonalities, totally equivalent to 12 major tonalities and 12 minor tonalities. However, in the development of the chromatic scales of each one of the above basic tonalities, my invention records the tonal values according to their corresponding theoretical denominations, including, therefore, the double sharps and flats.

The "Reader"

For retrieval of information from the "memory" tabulation of FIG. 1, I tabulate in a similar arrangement of 19 segments in columns of 7-value length technical musical data responsive to questions such as those concerning the tones and semi-tones, the scales in all their forms (chromatic, major and minor tonal, harmonic and melodic, diatonic, etc.), the chords in all their varieties (consonances, dissonances, major chords, minor chords, diminished, augmented, dominant, etc.), the tonal distances (2nd, 3rd, 4th, etc., major, minor, augmented, diminished and prime), the enharmonics, the harmonic laws, the basic chords, the modulations, the harmonic resolutions, the perfect major and minor chords, etc. These data for selected groups of questions are so positioned in the 19 segments of what we may here term the "reader" tabulation that when the reader is superimposed on the memory, the data of the reader will designate groups of tonalities of the memory for retrieval of desired technical musical data according to selected positions of adjustment of the superimposed tabulations. A representative reader tabulation is shown in FIG. 3. Here the tabulation takes the form of a reader disc in which data is tabulated within a grid formed by radial lines (real or imaginary) and concentric circles (real or imaginary). This grid consists of 38 columns circumferentially arranged to occupy 360° of the disc, each column of the grid being of a length which accommodates selected values within a total of 7 values for each column as measured by the concentric circles. The data of the disc is tabulated in the form of window openings 1 through which memory data will be selectively revealed for the desired read-out of information from the tabulation of FIG. 2. Not all of the 38 columns are used in the reader disc tabulation but it will be observed that if in addition to the columns containing one or more window openings we count the imaginary columns that lie between the window columns, we reach a total of 38. Thus the tabulation of FIG. 3 has an arrangement which is similar to that of FIG. 2 and which is in a sense a projection of the 38-column arrangement of the FIG. 2 memory. In FIG. 3 some of the imaginary columns are used in the numbering of the 7 values of each column and in conjunction with this numbering we see radial divider lines which mark off the several areas of the reader disc which respectively relate to the several kinds of questions which this particular disc is designed to answer.

EXAMPLE 1

As an example of the practice of my invention, let us assume that we want to know the "perfect chord" of the tone of B major; we go to the sector of "PERFECT MAJOR CHORD" of the reader and make the slots of the "identification circle" of the disc coincide over the indices of the chart belonging to the B segment. Once the indices are adjusted, all that has to be done is to read the tones indicated by the window openings: B, D sharp and F sharp. The numbers that appear adjacent the windows show the sequence of the tones within the chord.

EXAMPLE 2

Figure 4:
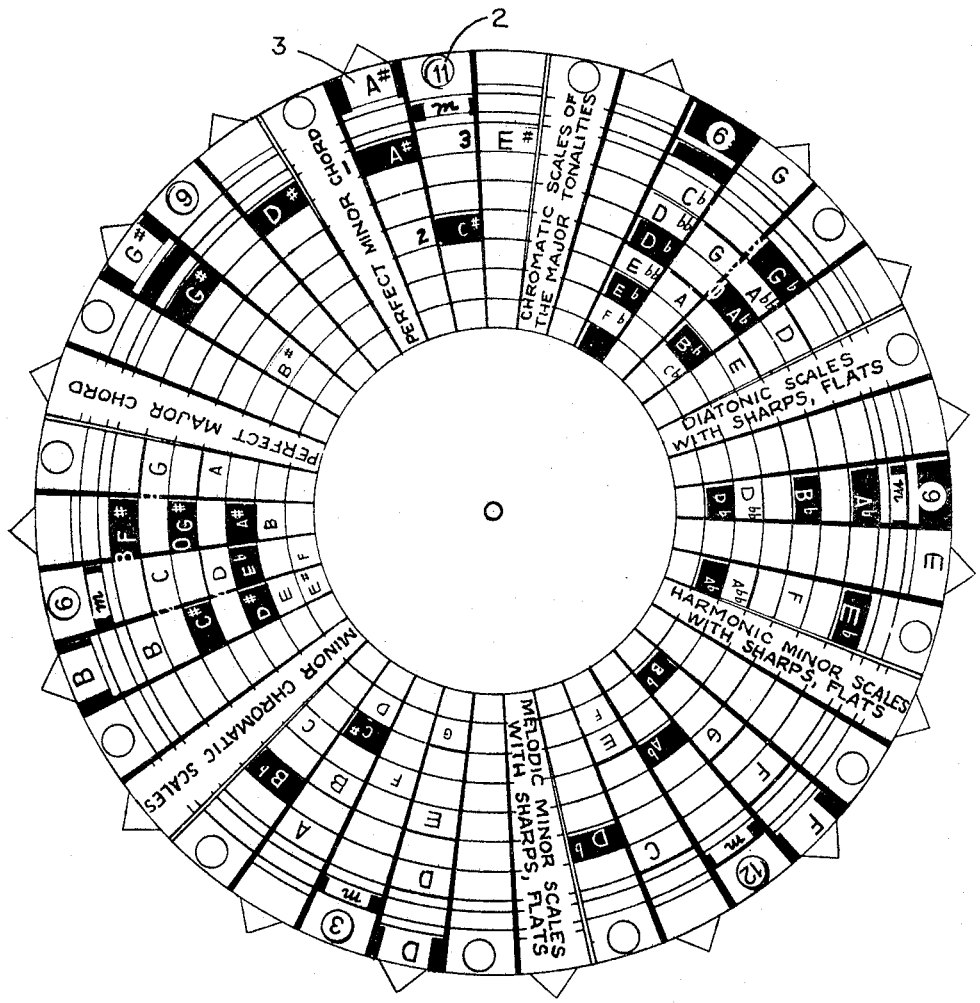
FIG. 4 illustrates a reader disc of the same general type as shown in FIG. 3 superimposed on the memory tabulation of FIG. 2.

Another example of the practice of the invention as performed with the use of the preferred form of apparatus shown will be explained with reference to FIG. 4 in which we will use the sector of the reader disc which contains the tabulated data designated "PERFECT MINOR CHORD." This sector of the reader as shown in FIG. 4 has been brought to the position on the memory which reveals the number of segment 11 as at 2 and the key of A sharp as at 3. The window openings reveal the minor chord A sharp, C, sharp, E sharp. Particular attention is drawn to the fact that the tonality E sharp is read from the "grey zone" of the memory furnishing an illustration of how the inclusion of such zone creates the essential continuity for solution of a broad range of problems of musical technique.

Figure 3:
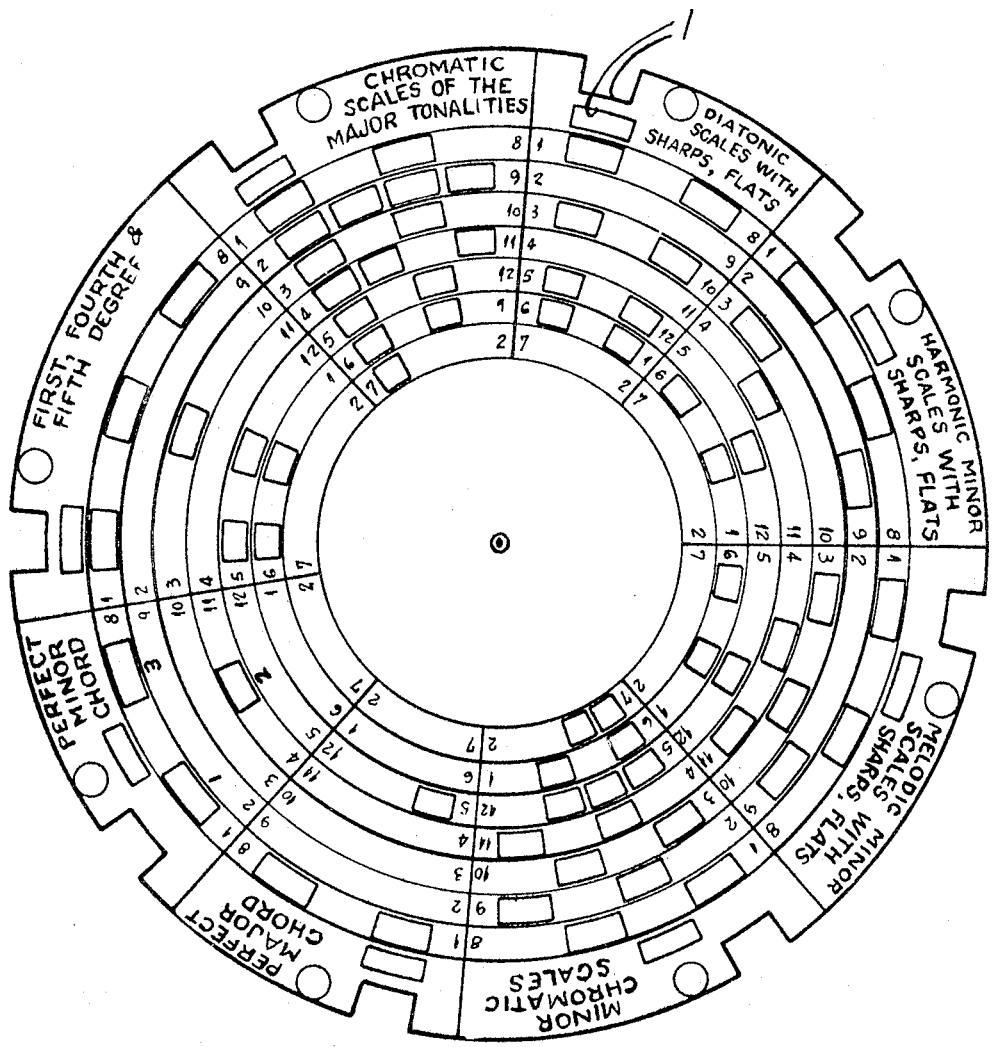
FIG. 3 shows one representative tabulation of musical data in the form of a reader disc which will designate groups of tonalities of the tabulation of FIG. 2 for visual retrieval of desired technical musical data.

When adjusting the reader disc for retrieval of information from the memory disc, the relative positions of the two discs should never be such as to overlap the end of the "sharps" and the adjacent end of the "flats," as indicated by the dot-dash division line D—D in FIG. 2. That is, the reader disc should not be positioned as to read out information from both sides of line D—D for any one setting of the reader. Such an overlap may occur on rare occasions in the tonalities of A sharp, C flat and G flat.

Apparatus

Figure 5:
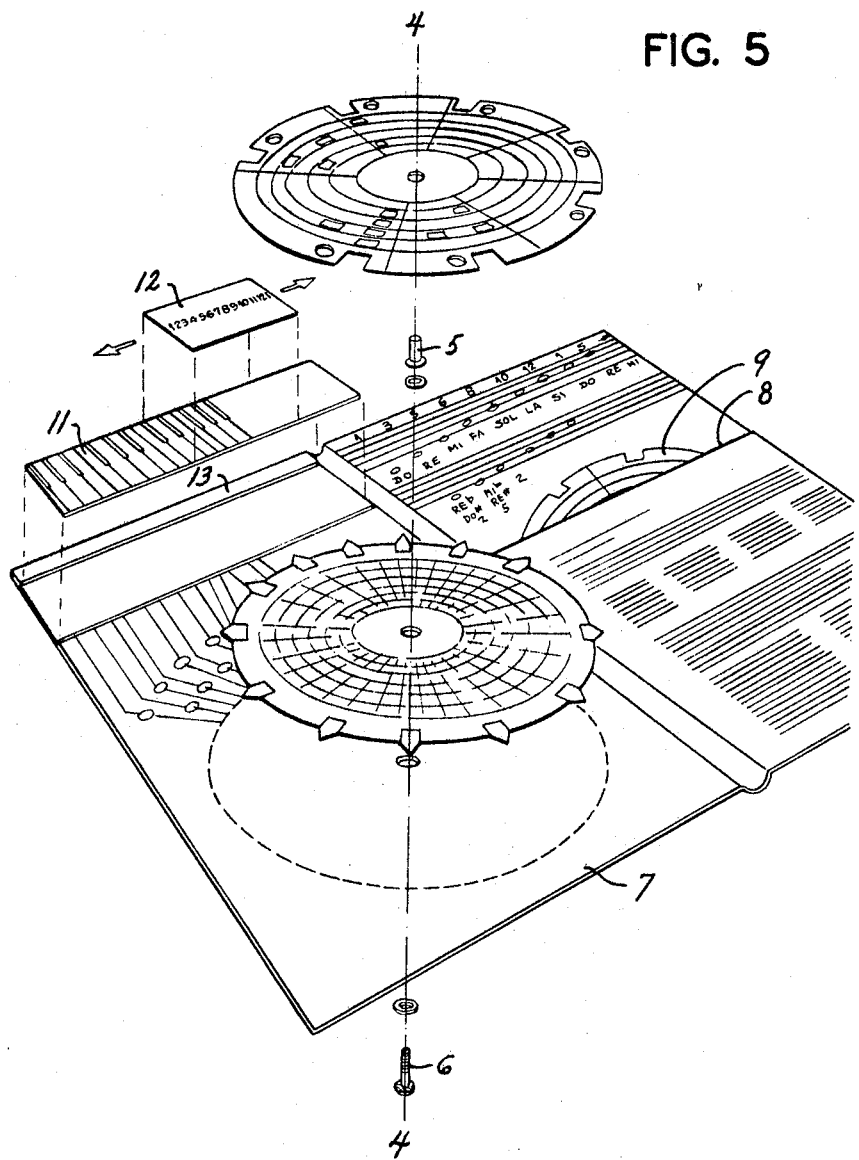
FIG. 5 is a perspective view of a preferred form of my apparatus in which the memory, reader and other parts are shown exploded to reveal the construction.

The primary elements of the apparatus as employed in the preferred form of my invention consist of the memory tabulation, FIG. 2, and the reader disc, FIG. 3. These elements are mounted for rotation relative to one another about a common pivot axis 4—4, FIG. 5, as by being centrally apertured to fit over a hollow sleeve 5, through which a suitable fastening passes to be secured by a nut or otherwise. The base of the relatively rotating parts may be comprised by the inside cover 7 of an album containing instructions for operation and provided with a pocket 8 to contain a series of reader discs 9 for solution of a variety of problems.

Figure 6:
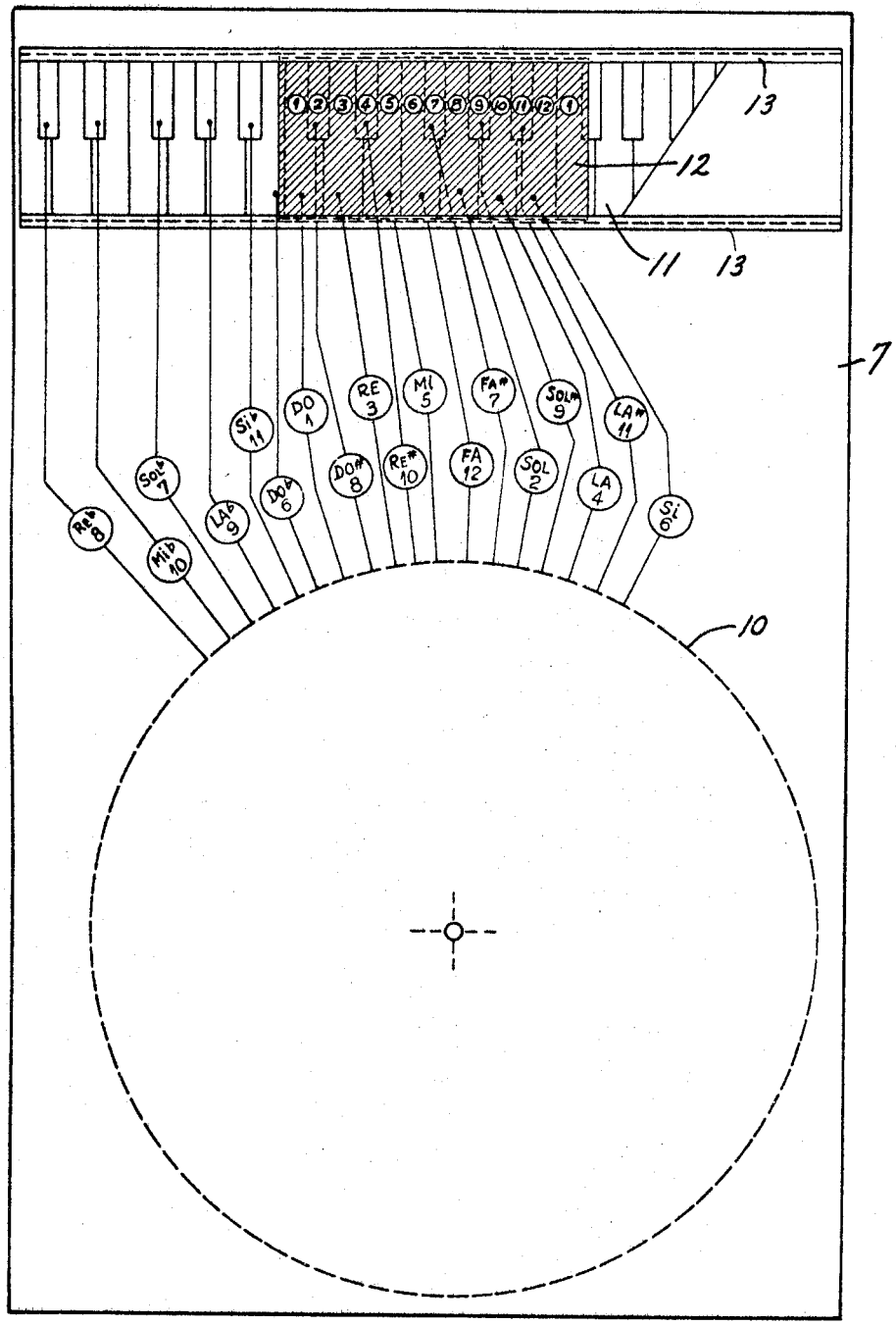
FIG. 6 is a detail view of the base of the apparatus of FIG. 5 which includes a representation of elements of the tone selecting means of a musical instrument and means for relating such elements to selected tonalities of the tabulation of FIG. 2.

The inside cover 7 of the album is reproduced in FIG. 6 which indicates the position of the overlying discs by the dotted circle 10. In the upper part of this view there is shown at 11 a section of a piano keyboard. Above such representation of the keyboard section is a transparent slide 12 numbered from 1 to 12 as shown, such slide being moveable into selected positions, guided by suitable rails 13 which extend around the edges of the slide. The piano keys are connected by lines to the circle 10 in a manner to provide an index setting for the memory disc in order to relate the piano keys to the tonalities of the memory tabulation. Thus it will be seen that in this embodiment of my apparatus there is included a representation of elements of the tone selecting means of a musical instrument (in this case the piano) and means for relating said elements (the piano keys) to selected tonalities of the memory tabulation of FIG. 2; the tone selecting means further including a transparent slide numbered from 1 to 12, such slide being moveable into selected positions to relate the slide numbering to any one of the major and minor tonalities. A similar arrangement is possible with respect to the tone selecting means of a variety of other instruments, as for example the frets of a guitar, the strings of a harp, the fingering of a violin, etc. The numbers of the slide 12 correspond to the sequence of the keys and each number coincides with one key. It will be observed that the tonalities that appear in FIG. 6 are accompanied by the respective serial numbers within the scales of fifths and fourths. Some tonalities appear with repeated numbers: C sharp and D flat (No. 8), G sharp and A flat (No. 9), D sharp and E flat (No. 10) and A sharp and B flat (No. 11). This duplicity is precisely equivalent to the one observed in the chart of tonal values, which means that the tonalities of different names but of identical numeration (tonal identity) occupy the same position in the scale of the instrument. As a specific example: let us assume that it is wished to determine in a given musical instrument as the piano, for instance, the position of the tones that constitute the perfect chord of the C major tonality. We have already seen that by making the identification circle of the "PERFECT CHORD" sector of the reader coincide with the indices of the memory comprised in the segment of the basic tonality of C, the information is immediately obtained: C–E–G. If there is an interest in hearing that chord on the piano, device of FIG. 6 is consulted and without breaking the coincidence between the reader and the memory, the index of the latter is adjusted corresponding to the basic tonality of C to the line of that tonality in FIG. 6 which is prolonged to the corresponding key in the piano (diagrammatic keyboard). That tonality is No. 1 in the sequence of the scales of fifths and fourths. The slide is then moved over the keyboard and No. 1 of the slide is placed on the key that is indicated (which is the one of the C tonality). Now, reverting to the perfect chord of C major which is C–E–G, we have: C (No. 1), E (No. 5) and G (No. 8). This slide of the keyboard is already applied with its No. 1 on the key that corresponds to that tonality; the E tonality will be in the key on which No. 5 of the slide falls and the G tonality in the key on which No. 8 falls.

This is an elementary example to explain the use of my invention in determining the tones in the musical instrument for conversion of visual into auditory data, but much more complicated cases are frequent, and are as easily handled.

In FIG. 2 the white characters on a black background correspond to the semi-tones of the black keys of the piano; the black characters on a white ground to the white keys.

I contemplate the preparation of a considerable number of reader discs which may advantageously be made in the form of sheets of different colors, each containing the highest possible number of circular sectors, each of which is designed to answer a different technical musical question.

The terms and expressions which I have employed are used in a descriptive and not a limiting sense and I have no intention of excluding equivalents of the invention described and claimed.

The embodiments of the invention in which an exclusive property or privilege is claimed are defined as follows:

1. An apparatus for storing and retrieving technical musical data comprising
    a bottom plate having a tabulation of chromatic tonalities arranged in columnar segments each designated by a basic tonality, with the columnar segments arranged with adjacent basic tonalities sequenced in accordance with a musical law of intervals, with each columnar segment composed of two adjacent columns respectively tabulating sharps and flats designations of consecutively increasing chromatic tonal values beginning with the basic tonality of the segment and ending with a tone removed by one half tone from the lowest chromatic tonality at the top of the column of the segment adjacent thereto, a top template having a plurality of sectors with read-out apertures, with each sector representing with its read-out apertures desired musical groupings substantially for anyone and all of the basic tonalities represented by the segments, each sector further being provided with an index aperture for registration of the sector read-out apertures over appropriate chromatic tonal values in the columns upon alignment of the index aperture over the basic tonality for which the musical grouping is to be determined.

said top template being adjustably mounted in superimposed relationship over the bottom plate tabulation to reveal selected individual chromatic tonal values in the columnar tabulations through the read-out apertures of a sector having its index aperture aligned over a basic tonality designation.

2. The apparatus as recited in claim 1 wherein the bottom plate tabulation thereon is circularly arranged about a center on the plate with the segments and columns thereof angularly distributed and the columns divided into concentric rings in correspondence with the number of consecutively increasing chromatic tonal values and wherein the top template is rotatably mounted to the bottom plate concentric with said center for rotation thereabout and with the read-out apertures of all sectors arranged at radial locations from the center in selected correspondence with underlying rings of the tabulated columns.

3. The apparatus as recited in claim 2 wherein the top template includes seven radial locations for read-out apertures in correspondence with seven underlying rings of column chromatic tonal value designations on the bottom plate, with the adjacent basic tonalities sequenced in accordance with the musical interval law of fifths and fourths.

4. The apparatus as recited in claim 3 wherein the top template index apertures are located at radial end locations from the center of the template in registration with underlying basic tonality designations.

5. The apparatus as recited in claim 2 wherein the top template is provided with read-out apertures of each sector distributed in a circular sector commencing at the center and with each sector having a peripherally located index aperture in alignment with underlying basic tonality designations.

References Cited

UNITED STATES PATENTS

| 1,804,460 | 5/1931 | Cordier | 84—474 |
| 2,542,235 | 2/1951 | Clopton | 84—474 |
| 3,358,920 | 12/1967 | Ringley | 235—88 |

FOREIGN PATENTS

| 62,692 | 6/1892 | Germany. |

RICHARD B. WILKINSON, Primary Examiner

L. R. FRANKLIN, Assistant Examiner

U.S. Cl. X.R.

84—470; 235—88